No. 719,314. PATENTED JAN. 27, 1903.
H. H. EATON.
MACHINE FOR FASTENING LACING HOOKS IN SHOES.
APPLICATION FILED JULY 15, 1899.
NO MODEL. 7 SHEETS—SHEET 1.

ATTEST
INVENTOR
Harrison H. Eaton
BY W. F. Fisher
ATTY

No. 719,314. PATENTED JAN. 27, 1903.
H. H. EATON.
MACHINE FOR FASTENING LACING HOOKS IN SHOES.
APPLICATION FILED JULY 15, 1899.
NO MODEL. 7 SHEETS—SHEET 2.

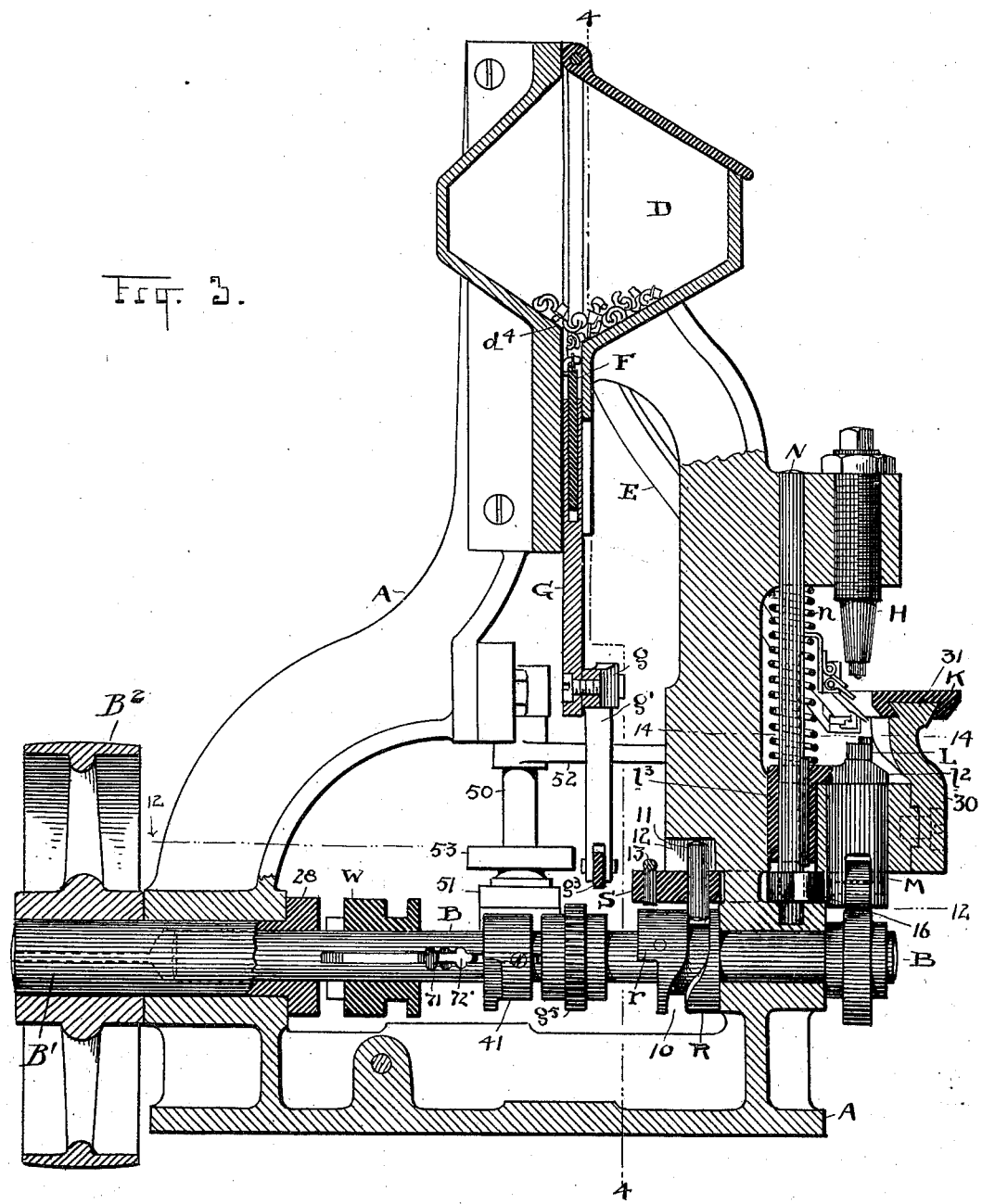

No. 719,314. PATENTED JAN. 27, 1903.
H. H. EATON.
MACHINE FOR FASTENING LACING HOOKS IN SHOES.
APPLICATION FILED JULY 15, 1899.
NO MODEL. 7 SHEETS—SHEET 4.
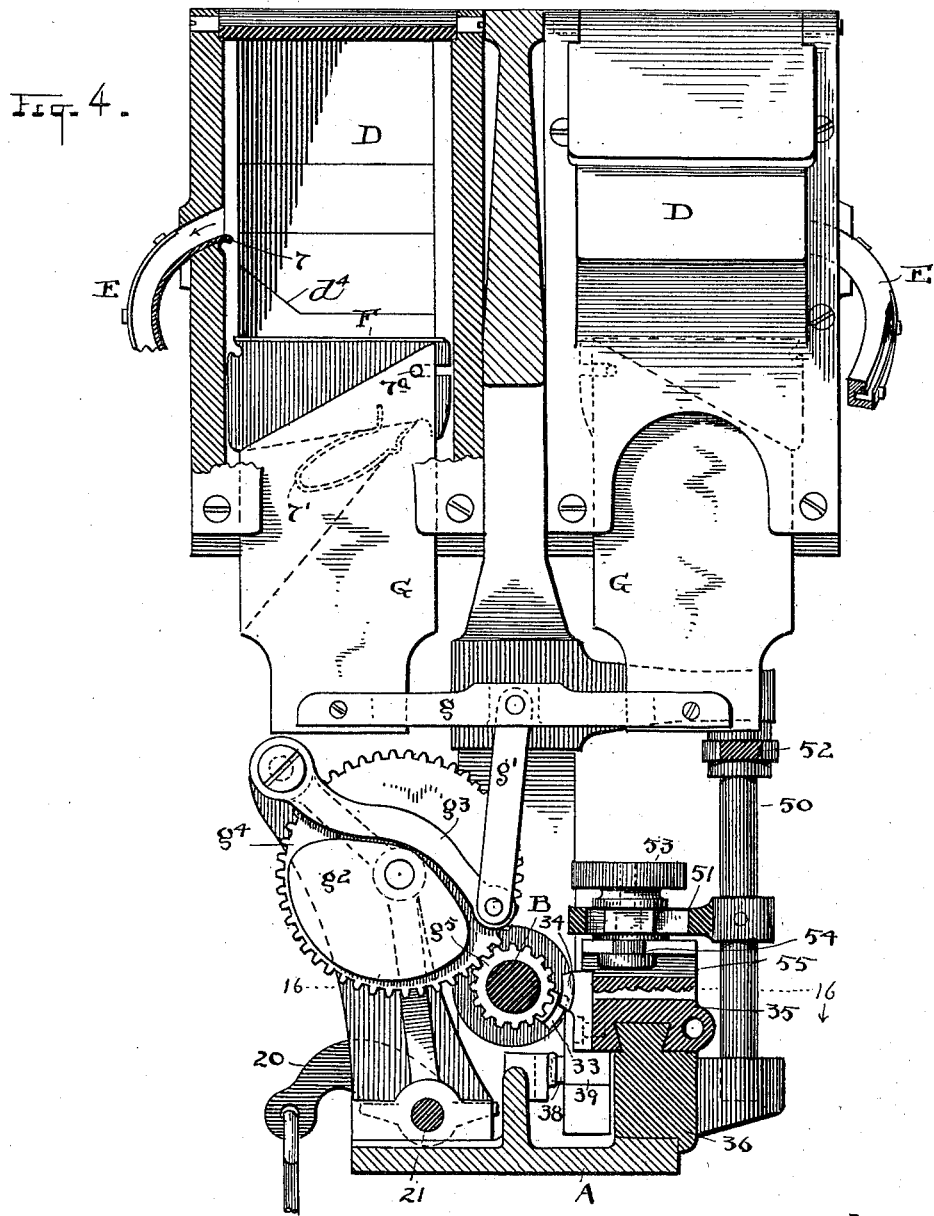
ATTEST
R. B. Moser
H. E. Mudra
INVENTOR
Harrison H. Eaton
BY W. F. Fisher
ATTY

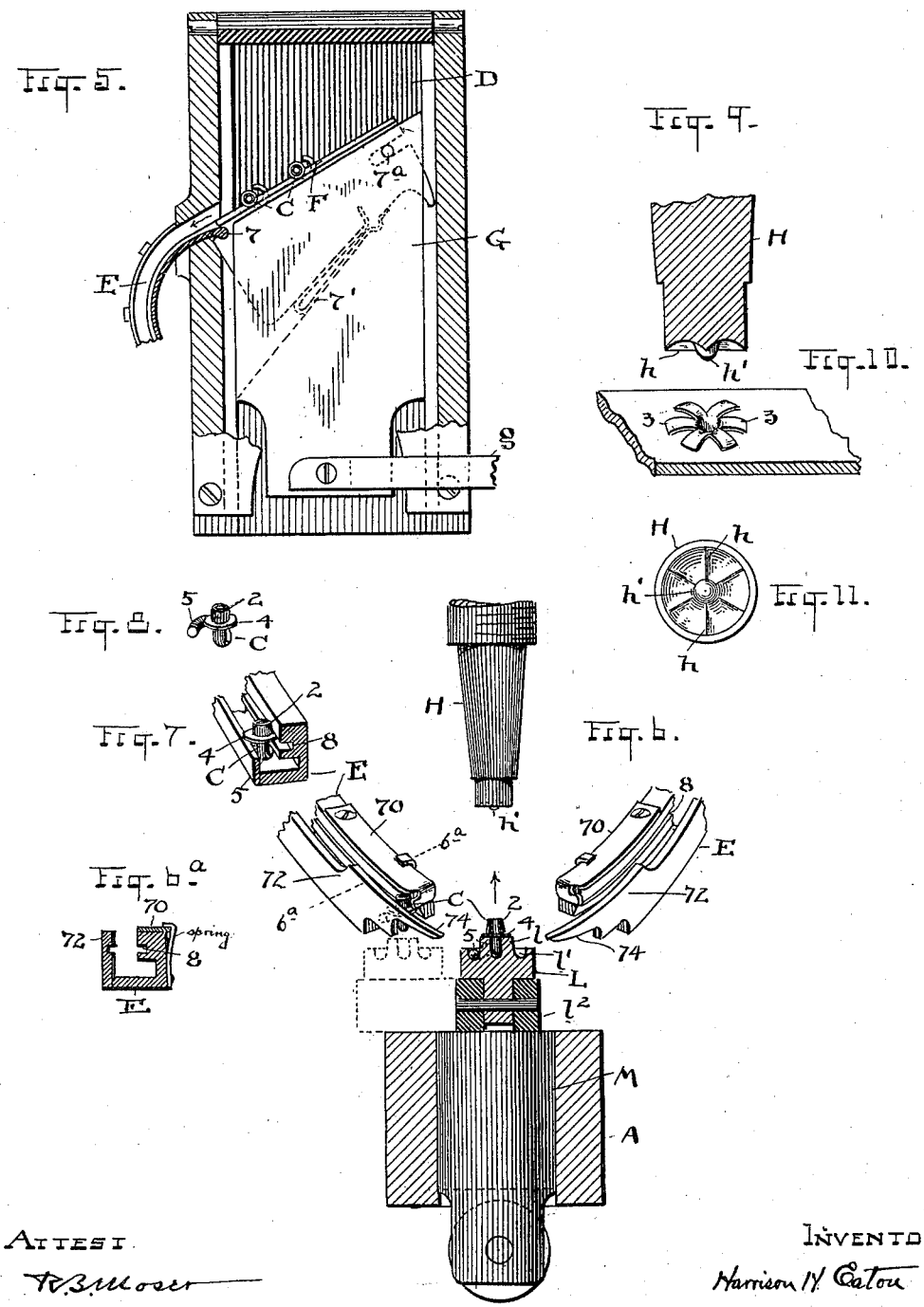

No. 719,314. PATENTED JAN. 27, 1903.
H. H. EATON.
MACHINE FOR FASTENING LACING HOOKS IN SHOES.
APPLICATION FILED JULY 15, 1899.
NO MODEL. 7 SHEETS—SHEET 6.
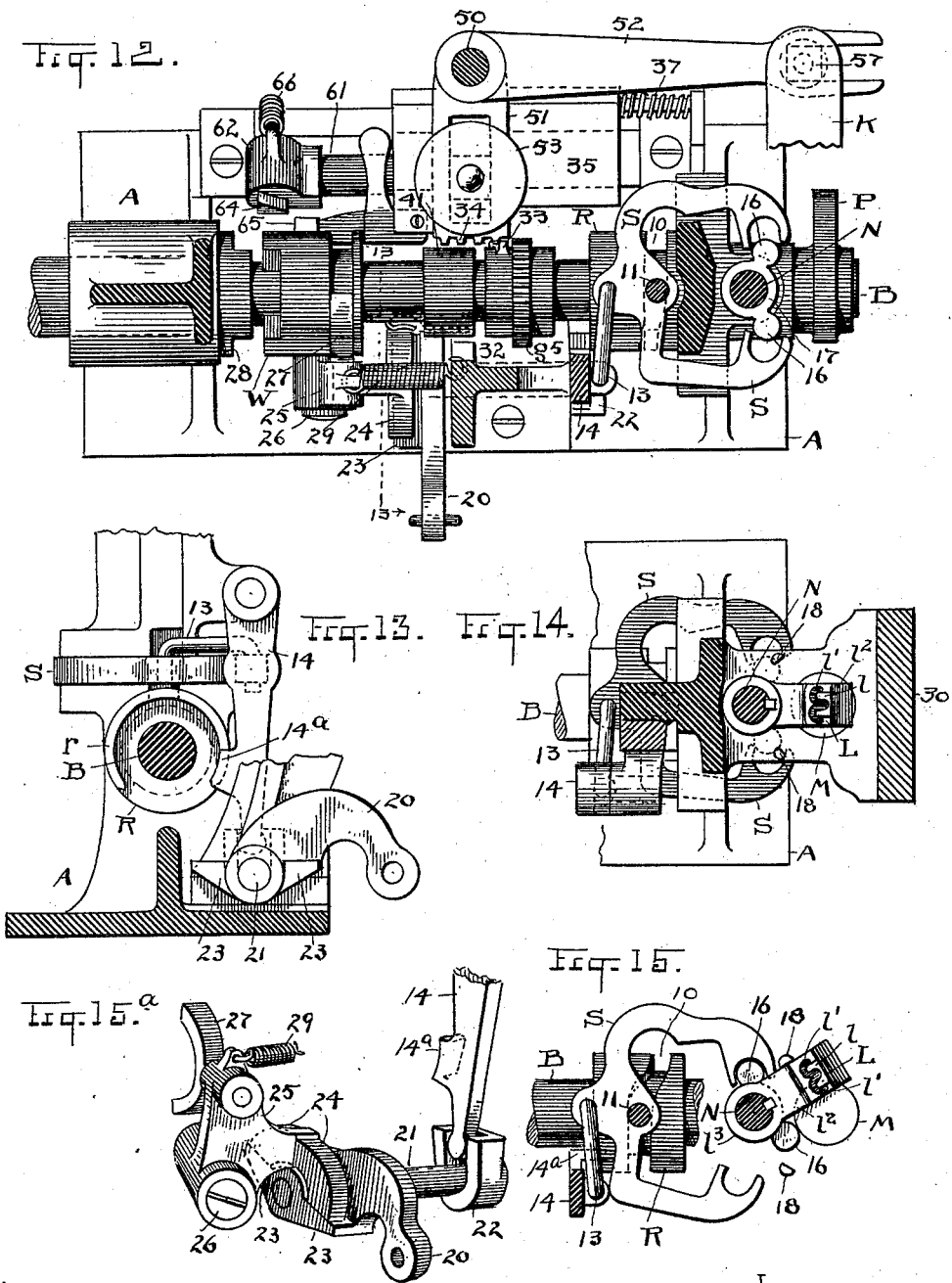

No. 719,314. PATENTED JAN. 27, 1903.
H. H. EATON.
MACHINE FOR FASTENING LACING HOOKS IN SHOES.
APPLICATION FILED JULY 15, 1899.
NO MODEL. 7 SHEETS—SHEET 7.
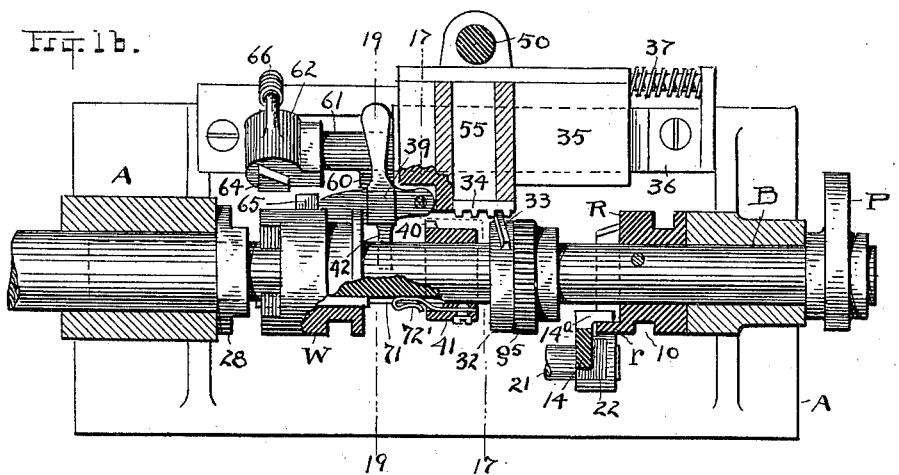
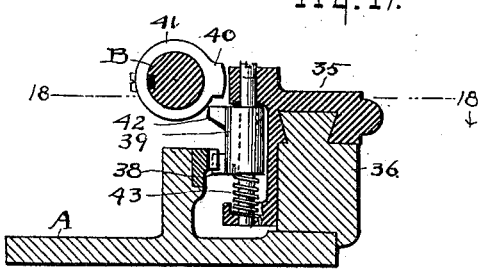 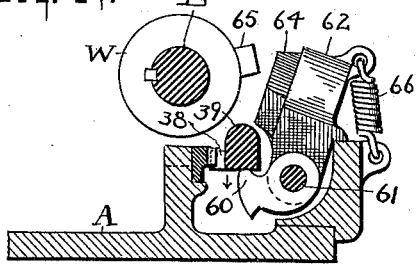
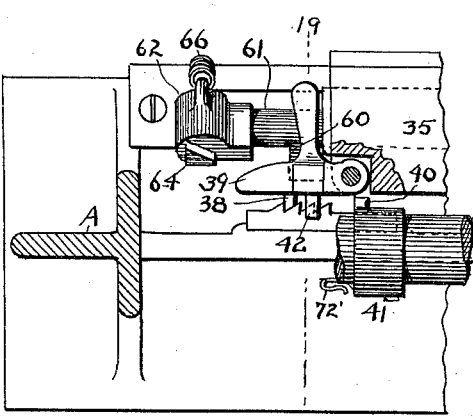
ATTEST
INVENTOR.
Harrison H. Eaton
By H. T. Fisher
ATTY

UNITED STATES PATENT OFFICE.

HARRISON H. EATON, OF CLEVELAND, OHIO, ASSIGNOR TO THE UNITED SHOE MACHINERY COMPANY, OF PATERSON, NEW JERSEY, A CORPORATION OF NEW JERSEY.

MACHINE FOR FASTENING LACING-HOOKS IN SHOES.

SPECIFICATION forming part of Letters Patent No. 719,314, dated January 27, 1903.

Application filed July 15, 1899. Serial No. 723,954. (No model.)

*To all whom it may concern:*

Be it known that I, HARRISON H. EATON, a citizen of the United States, residing at Cleveland, in the county of Cuyahoga and State of Ohio, have invented certain new and useful Improvements in Machines for Fastening Lacing-Hooks on Shoes; and I do declare that the following is a full, clear, and exact description of the invention, which will enable others skilled in the art to which it appertains to make and use the same.

This invention relates to machines for fastening or, as it is generally termed in the art, "setting" lacing hooks or studs, and more particularly to a machine for fastening lacing-hooks on the uppers of shoes, said hooks being of different shapes on the two sides of the upper, or what are known as "right" and "left" hooks.

The object of the present invention is to provide an efficient machine for fastening right and left lacing-hooks on the uppers of shoes or on other articles or material.

Certain features of my present invention are applicable to machines for fastening lacing hooks or studs which are not rights and lefts and also to machines for setting eyelets; and a further object of my invention is, then, to improve the construction and arrangement of parts and mode of operation of such machines.

With these objects in view my invention consists in the devices and combinations of devices hereinafter described and claimed.

A preferred form of my invention is illustrated in the accompanying drawings, in which—

Figure 1:
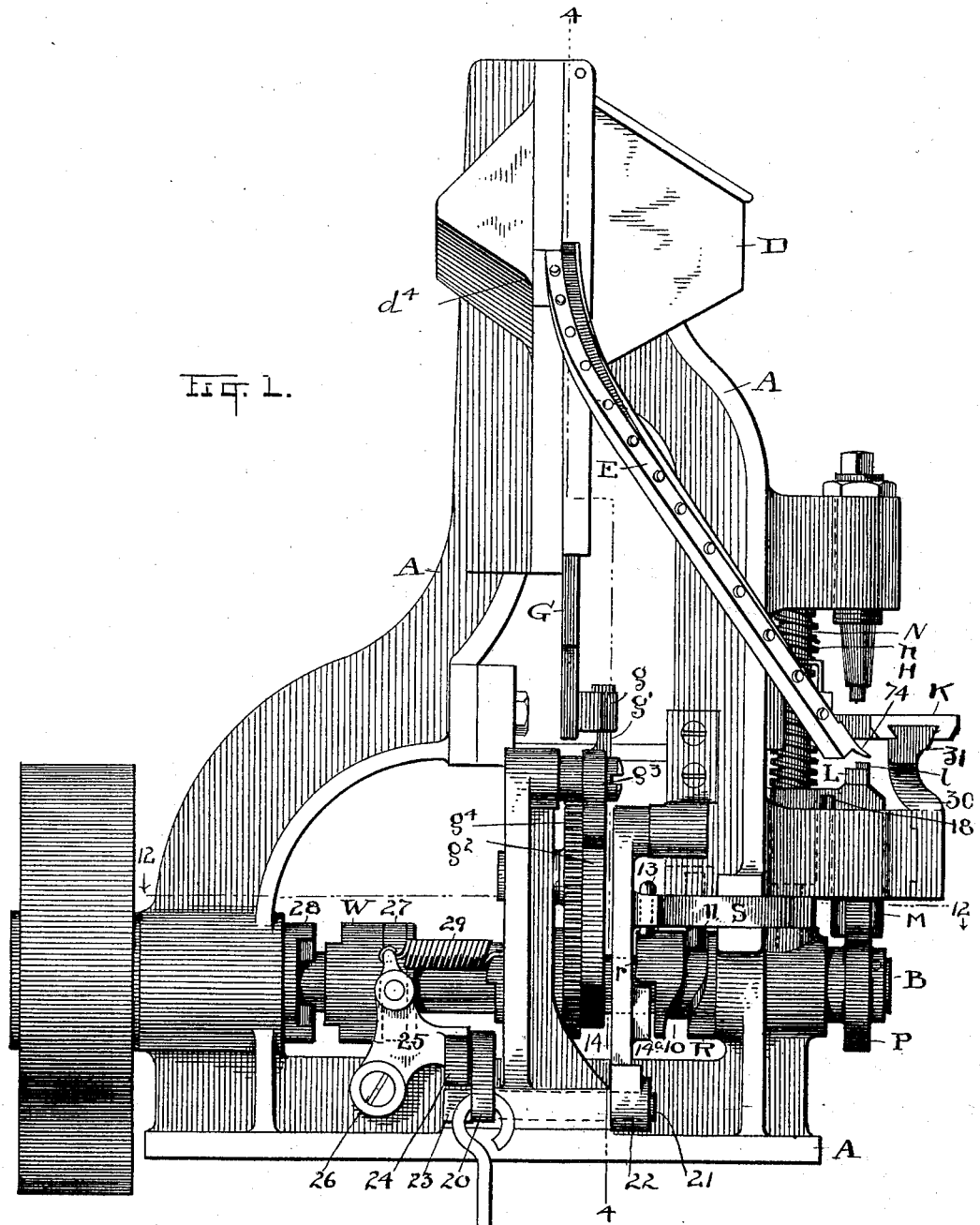
Figure 2:
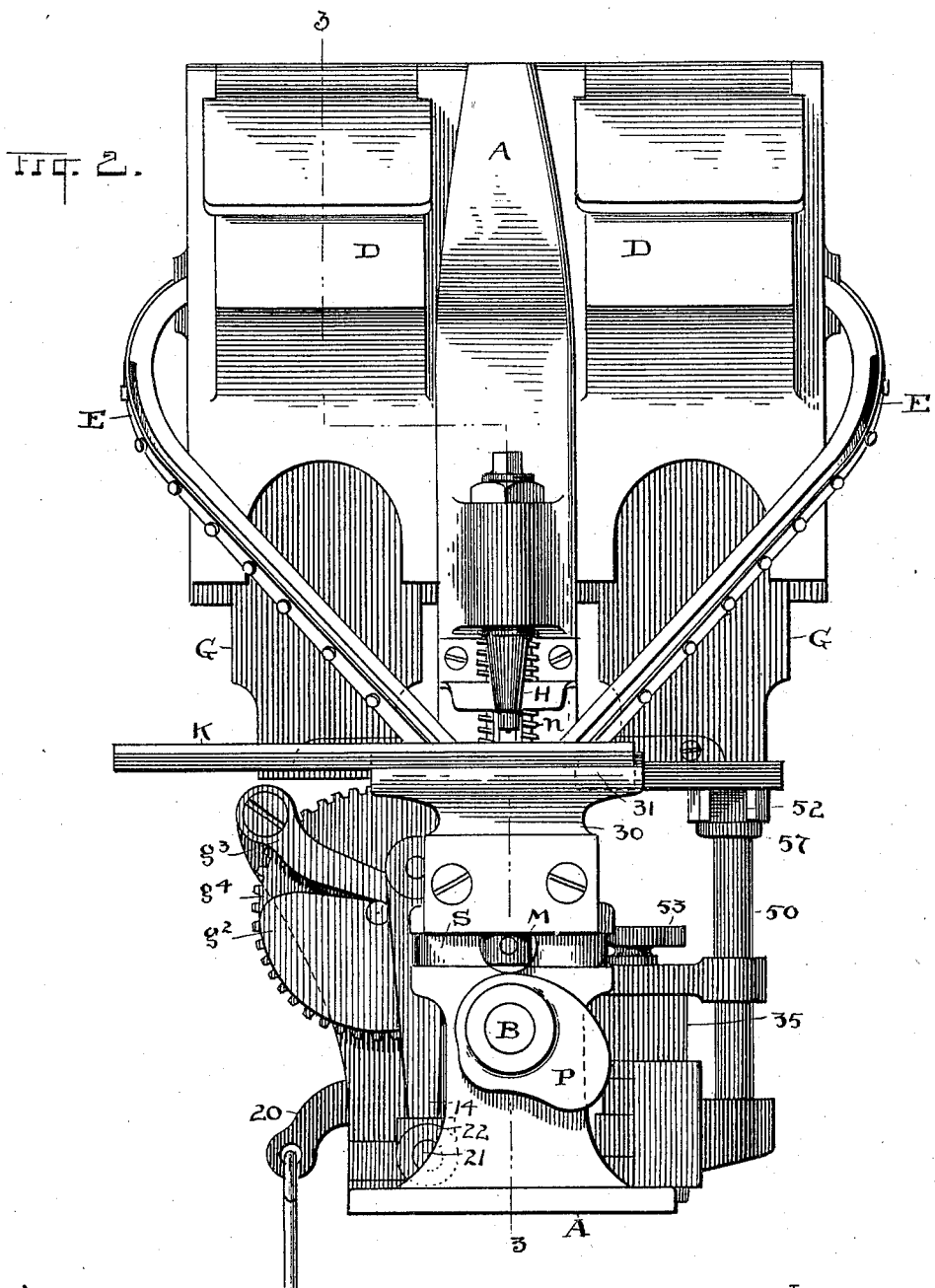

Figure 1 a view in side elevation of a machine embodying the same. Fig. 2 is a front elevation. Fig. 3 is a longitudinal sectional view on the line 3 3 of Fig. 2 looking to the right. Fig. 4 is a transverse sectional view on the line 4 4 of Fig. 3 looking to the left. Fig. 5 is a detail sectional view of one of the hoppers for receiving the hooks, showing the hook-lifting plate and its carrier-plate in their raised positions. Fig. 6 is a detail view of the upper and lower dies, the plunger for actuating the lower die, and the lower ends of the feed-chutes for the hooks, the lower die being shown in section. Fig. 6$^a$ is a detail sectional view of one of the feed-chutes on the line 6$^a$ 6$^a$, Fig. 6. Fig. 7 is a detail sectional view of one of the feed-chutes, showing a hook in position in the channel. Fig. 8 is a view of one of the lacing-hooks. Fig. 9 is a detail sectional view of the lower end of the upper die. Fig. 10 is a view of a portion of a shoe-upper, showing the manner in which the hook is attached thereto. Fig. 11 is a bottom plan view of the lower end of the upper die. Fig. 12 is a sectional plan view on the line 12 12 of Figs. 1 and 3. Fig. 13 is a transverse sectional view on the line 13 13, Fig. 12. Fig. 14 is a detail plan view on the line 14 14, Fig. 3, the lower die being in its central position. Fig. 15 is a view similar to Fig. 14 with the die swung to one side of its central position, the frame of the machine being removed. Fig. 15$^a$ is a perspective view of the clutch-actuating member, the member for shifting the connections between the driving-shaft and the lower die, and the lever for actuating these members. Fig. 16 is a sectional plan view on the line 16 16, Fig. 4. Fig. 17 is a cross-sectional view on the line 17 17, Fig. 16. Fig. 18 is a plan view of the parts shown in Fig. 17; and Fig. 19 is a cross-sectional view on the line 19 19, Fig. 16.

The machine illustrated in the drawings is especially designed for fastening upon shoes the particular style of lacing-hook shown in Fig. 8; but it will be understood that by making suitable changes in the shape of certain parts the machine can be made capable of fastening other forms of hooks or studs. The hook shown in Fig. 8 and designated as a whole by the letter C is clearly illustrated and described in my Patent No. 654,237, dated July 24, 1900, and consists of a tubular stem or shank 2, a flange 4, forming the base of the hook, and a curved portion 5, forming the body portion of the hook. These hooks are made rights and lefts, and the machine to be hereinafter described is provided with means for holding separate supplies of right and left hooks and with means for feeding a hook from either supply to the setting-dies.

The machine which I have illustrated in the drawings as embodying my invention is provided with a pair of dies and with actuating mechanism therefor to cause the dies to set the hook in the material and with the means above referred to for holding separate supplies of right and left hooks and for feeding a hook from either supply between the setting-dies. The means for holding the hooks consist of two chutes, to which the hooks are supplied by suitable hook assorting and feeding mechanism. The ends of the chutes extend on opposite sides of the dies, and for feeding a hook from either chute between the dies means are provided for moving one of the dies, preferably the lower, to and from either chute.

Coöperating with the dies is a feeding mechanism arranged to advance the material step by step between the dies. This mechanism advances the material the distance between successive hooks, and as the distance between the hooks varies with the style and size of shoe and with the number of hooks on a side means are provided for adjusting the extent of the step-by-step feeding movements.

The machine is also provided with means for automatically throwing the die actuating and feeding mechanisms out of operation after a certain number of feeding movements, said means having provision for adjustment whereby the number of feeding movements before such mechanism operates can be varied. The machine is also provided with means under the control of the operator for throwing the die actuating and feeding mechanisms out of operation after any feeding movement.

The features above enumerated and others to be referred to will be more clearly understood from the following detail description of the machine shown in the drawings.

Referring to the drawings, in which like characters of reference indicate like parts, A designates the frame of the machine, of any suitable construction for supporting the operating parts, and B a driving-shaft from which the moving parts of the machine are operated, said shaft extending longitudinally of the frame and being journaled at its forward end in the frame and at its rear end in a hole bored axially in the power-shaft B', journaled in the frame of the machine and having secured thereto a driving-pulley $B^2$.

D D represent two hoppers, one on each side of the upper part of the machine-frame, into which the right and left hand hooks are thrown in quantity, respectively. In the side of each of the hoppers is formed a discharge-opening, and from each of these openings a feed chute or channel E of a cross-section suitable for supporting the hooks extends to the vicinity of the lower die. To gather up or trap the hooks in the hoppers, I employ the mechanism shown in Figs. 3, 4, and 5, in which are shown two plates F G, arranged to reciprocate vertically in the hopper to and from the discharge-opening. The plate F is pivotally mounted upon the plate G in the construction shown, the upper portion of the plate G being provided with an open slot, in which the plate F is located. The plate F is the lifting and discharging plate for the hooks, and normally its top edge is horizontal, as shown in Fig. 4. The plate G forms a carrier for the plate F and has an inclined top edge or edges. The plate F is secured to the plate G by means of a pin $7^a$ in the plate G, engaging a slot in the plate F, and by a spring 7', which normally holds the plate F with its upper edge horizontal. The feed-chute E projects into the hopper D, as at 7, and as the plates F and G rise this projection engages a notch in the plate F and acts to tilt said plate until its upper edge is in an inclined position parallel with the inclined upper edge of the plate G. The plate F has a tongue along its upper edge which engages the hooks between the body portion and the flange 4, the hooks so engaged being carried upward with the plate, and when the plate is tilted into the position shown in Fig. 5 sliding upon the inclined edge of the plate and being guided thereby to the discharge-opening. In their passage to the discharge-opening the body portions of the hooks are supported on the inclined upper edge of the plate G, the body portions of the hooks by resting on such supporting edge being turned into a position to pass through the discharge-opening. The plates F and G reciprocate through openings in the bottom of the hoppers, the hoppers being extended downwardly from such openings to form guides for the plates. For actuating the plates the plates G are connected by means of a cross-piece $g$, said cross-piece being connected by means of a link $g'$ to a lever $g^3$, pivoted to the frame of the machine and actuated by means of a cam $g^2$, secured to one side of the gear-wheel $g^4$, meshing with the pinion $g^5$ on the shaft B. By means of this mechanism the two plates F and G are raised and lowered in each hopper simultaneously and keep the feed-chutes supplied with hooks without attention to this part of the mechanism, except to replenish the supply of hooks in the hopper when necessary. The rear wall of each hopper is provided with an inclined portion $d^4$, extending from a point below the discharge-opening toward the center of the hopper. The hooks which fail to pass through the discharge-opening fall on this inclined portion and are returned to the center of the hopper, thereby preventing the massing of the hooks beneath the opening.

The shape of the discharge-opening in the hoppers is such that the hooks can pass through them only when in a certain position, and the channels of the feed-chutes are so formed as to hold and guide them in this position to the dies. As shown in Fig. 7, the flange 4 of the hook rides on the outer end of the chute and in a groove 8, while the body portion of the hook is guided by the enlarged lower portion of the channel. The hooks are thus guided to the lower ends of the feed-chutes and are there held in position to be taken by the lower die by the means shown in Fig. 6. As shown in said figure, the lower side of the end of the chute is cut away, and the hook is supported by the groove 8 and by a groove in a plate 72, secured to the side of the chute, with which the flange 4 of the hook engages. A spring-pressed plate 70, provided with a detaining-hook, holds the hook in position until taken by the die. The end of the plate 72 is cut away to allow the die to rise to receive the hook and is provided with a finger 74, which presses the hook into the die as the die returns to its central position beneath the upper die.

H and L designate the upper and lower dies, respectively. The lower die is shaped to receive the body portion of the hook and to support the base portion or flange, and the upper die is shaped to bend over the tubular stem or shank of the hook upon the material to clamp the material between such portion and the flange of the hook. It is necessary that the body portion of the hook be held in a certain position while the hook is being fastened to the material in order that it may extend in the proper direction after the hook is so fastened. For so receiving and supporting the hook and holding the body portion of the hook in the required position for fastening to the shoe-upper the lower die is provided with an upward projection $l$, upon the upper surface of which the flange of the hook is adapted to rest, and the projection $l$ is provided with a recess or groove $l'$ for receiving the body portion of the hook, said groove being also extended into the die and being of substantially the shape of the body portion. By this construction the flange or base portion of the hook is supported and the body portion of the hook is held in the required position so that when inserted in the material the body portion of the hook will be in correct position on the shoe-upper. It will be evident, however, that the recess in the die need not necessarily fit the whole of the body portion of the hook, as this holding function will be performed if only a portion of the hook is engaged. It is also to be understood that other means might be provided for holding the body portion of the hook in required position.

It will be noted that in the construction shown the recess $l'$ is so shaped that the body portion of the hook can be received thereby and removed therefrom in the direction of the axis of the die, by which construction the lower die is enabled to take a hook from the feed-chutes, as will be described, and the hook is left in the material when the dies separate after the setting operation.

The working face of the upper die H is provided with radial cutting edges $h$ for splitting the tubular stem of the hook, a central rounded and somewhat pointed projection $h'$, adapted to enter the stem of the hook, and with recesses between the cutting edges for bending over and pressing down the split sides of the stem, as seen in Fig. 10.

The upper die is stationary, being adjustably secured in a forwardly-extended portion of the main frame by means of its screw-threaded shank engaging a screw-threaded hole in the frame, the die being held in position after adjustment by means of a locking-nut, as shown in Fig. 3. The lower die is reciprocated toward and from the upper die to force the stem of the hook through the material and against the upper die, and for feeding the hooks from either chute between the dies the lower die is arranged to move from its central position beneath the upper die to and from either chute.

The mechanism for giving the lower die the movements above referred to may be constructed as follows: The die L is secured to an arm $l^2$, as shown in Fig. 6, said arm having a hub $l^3$, splined on a vertical shaft N, Fig. 3, journaled in the frame at one side of the dies, said shaft forming a pivot for the lower die, with which it turns and lengthwise of which it is free to reciprocate. For reciprocating the die L a plunger M is provided, on the upper end of which the arm $l^2$ is supported, a cam P on the shaft B acting to raise the plunger, with the arm $l^2$ and die L, and a spring $n$ on the shaft N acting to depress said parts. The mechanism for moving the die L to and from either chute is shown more particularly in Figs. 14 and 15, in which R designates a collar on the shaft B, provided with a cam-groove 10, engaging a pin 11, secured to a double-armed yoke S, the upper end of the pin 11 projecting into a straight slot 12, formed in the machine-frame and actuating to guide the yoke S when actuated by the cam-groove. The arms of the yoke pass through slots in the frame, as shown, and each arm has a cavity at its extremity adapted to engage a rounded projection 16 on a collar 17, secured to the shaft N below the hub of the arm $l^2$. Stops 18 limit the throw of the die to either side. For shifting the yoke S to cause either arm to engage a projection 16 a link 13, engaging the heel of the yoke and connected to a lever 14, is provided. By actuating the lever 14 the yoke S can be shifted to bring either arm of the yoke in engagement with a projection 16, and when so engaged the die L will be moved from its central position under the upper die to and from one or the other of the chutes.

The driving-shaft B is provided with a longitudinally-movable clutch member W splined thereon, and the power-shaft B' is provided with a clutch member 28, with which the member W is adapted to engage to clutch the two shafts together. Means are provided for moving the lever 14 in opposite directions to throw one or the other of the arms of the yoke S into operative engagement with a projection 16 and for simultaneously moving the clutch member W into engagement with clutch member 28. As shown, the lever 20, which throws the clutch member W into engagement with clutch member 28, also serves to move lever 14 and shift yoke S through the mechanism shown in Figs. 12 and 15ª, in which lever 20 is shown as fixed on one end of a short shaft 21, while the lever 14 is supported in a socket 22 on said shaft at the other end. By this construction if the lever 20 is raised it throws the lever 14 in one direction and if depressed throws it in the other direction, and thereby through the link 13 shifts the yoke S into engagement with one or the other of the projections 16. Secured to the lever 20 are oppositely-extending arms 23, which engage arms 24 on the clutch-operating member 25, pivoted on the short shaft or screw 26. A segment 27 on the member 25, at right angles to arms 24, engages a groove in the clutch member W and serves to throw said clutch member in or out of engagement with the corresponding clutch member 28 on shaft B'. A retracting-spring 29 serves to hold the clutch W normally out of engagement.

In the machine shown in the drawings the mechanism for feeding the material between the dies comprises the shoe-carrying table K, arranged to have a step-by-step forward movement, corresponding in each step to the distance the hooks are to be spaced apart. The table has a dovetailed sliding connection with its supporting-arm 30, Fig. 3, which arm has a somewhat-extended bearing-surface 31, as seen in Fig. 2, and the arm 30 is rigid, but removably fixed to the main frame. For giving the table K a step-by-step forward movement a collar 32, Fig. 16, having an inclined cam-rib 33 arranged to engage successively the teeth on rack 34, is secured to the shaft B. The said rack is fixed on the side of a carriage 35, having a dovetailed connection with its support or base 36, on which it slides. A pawl 38 on the carriage 35 engages the teeth of a rack formed on or secured to the machine-frame and holds the carriage from backward movement. This pawl, Fig. 18, is on an arm 39, pivoted on the carriage, which arm is spring-pressed to keep the pawl in engagement with the rack.

Connection is made between the table K and the carriage 35, so as to actuate the table by means of an upright rotatable shaft 50, Figs. 4 and 12, supported at its ends from the main frame and carrying two arms 51 and 52 at right angles to each other and at different elevations. The arm 51 is slotted lengthwise and engaged by a sliding block locked in place by a set-screw 53 and a bolt 54, which extends through said block and engages overhanging flanges in the slotted top portion 55 of the carriage 35. By moving the set-screw nearer to or farther from the shaft 50 a greater or less rotation of said shaft is produced and a like change is effected in the distance the table K is moved at each successive actuation. The upper arm 52 has an open slot in its end, in which is engaged the outer end of table K by means of a screw 57, and a square block thereon free to run back and forth in said slot, so that a pivotal relation is established between said parts. After a predetermined number of feeding movements the table K is automatically returned to its initial position by the spring 37, and for allowing the spring to so act the pawl 38 is thrown out of engagement with its rack, as will now be described.

A collar 41, provided with a tooth 40, is secured to shaft B, which is adapted to engage a lug 42 on the arm 39, carrying the pawl 38, when the lug is brought into the path of the tooth by the forward movement of the carriage 35 and depress the arm 39 to throw the pawl 38 below its rack. To permit this downward movement, the arm 39 is supported upon its pivot by means of a coiled spring 43, as shown in Fig. 17.

The number of hooks fastened to each side of the shoe-upper varies with the size and style of the shoe, and in order to correspondingly vary the number of feed movements imparted to the table K before it is returned to its initial position the driving-shaft B has a longitudinal channel 71, and the collar 41 has attached thereto a spring, with lugs on one or both sides to engage notches in said channel, whereby the collar can be adjusted on the shaft to trip the arm 39 after any desired number of feeding movements.

After all the hooks have been fastened to one side of the upper it is desirable that the operating mechanism of the machine, including the die-actuating mechanism and the feeding mechanism, be thrown out of operation. Means are accordingly provided for throwing such mechanism out of operation simultaneously with the return of the feed-table, such means, as shown, consisting of a short shaft 61, journaled in the machine-frame, provided with a lateral projection 60, extending beneath the arm 39, as shown more particularly in Fig. 19. The shaft 61 is also provided with an arm 62, having formed thereon an inclined lug 64, adapted to engage an inclined lug 65 on the clutch member W and force said member out of engagement with the member 28. When the arm 39 is depressed by the engagement of the tooth 40 with the lug 42, the shaft 61 is rocked to bring the lug 64 in the path of lug 65, the engagement of the lugs 64 and 65 during the continued rotation of the shaft B forcing the clutch member W away from member 28. A spring 66, connected to arm 62, normally holds the lug 64 out of the path of lug 65.

As a means for throwing the die actuating and feeding mechanism out of operation after any feeding movement or after one or more complete cycles of operation in setting a hook the following mechanism is provided: The collar R is provided with a segmental flange r, with which a short segmental flange or projection 14ª on the lever 14 engages during the rotation of the collar. The flange 14ª is adapted to run either within or without the flange r and when in either position serves to hold the clutch members W and 28 locked during the greater portion of the revolution of shaft B through the connections shown in Fig. 15ª and hereinbefore described. When, however, the shaft B completes its revolution, the opening in the flange r comes opposite the flange 14ª and the lever 14 is free to move. If at this time the lever 20 has been released by the operator, the spring 29 will actuate the clutch-actuating member 25 to separate the clutch members. In addition to holding the clutch members locked for a single revolution of the driving-shaft the flange r also serves to hold the yoke S in engagement with one or the other of the projections 16.

It will be apparent that the mechanism above described for feeding the material and the means for throwing the die actuating and feeding mechanisms out of operation constitute an invention equally applicable to an eyelet-setting machine. The claims directed to these features of my invention are therefore to be construed as covering the combinations recited therein in an eyeleting-machine as well as in a hook-setting machine, the eyelet-feeding mechanism and setting-dies of such a machine being the equivalents of the hook-feeding mechanism and setting-dies mentioned in said claims.

The operation of the machine above described is as follows: The collar 41 having been adjusted on the shaft B to correspond with the number of hooks to be fastened on each side of the shoe-upper and the block having been adjusted in the slot in the arm 51 to give the feed-table the requisite movements to space the hooks the desired distance apart, the shoe-upper is placed on the table K with its edge extending between the dies H and L in position to have the first hook attached thereto. The lever 20 is now either raised or lowered by means of a treadle and suitable connections, (not shown,) according as to whether right or left hooks are to be attached to the shoe-upper. If the side of the upper to which the hooks are to be attached is the right side, the lever 20 is raised, and thereby, through one of the arms 23 engaging one of the arms 24 of the clutch-actuating member 25, the clutch member W is moved into engagement with the clutch member 28, and through the shaft 21 and arm 22 the lever 14 is moved to shift the yoke S into the position shown in Fig. 15. The driving-shaft B now revolves and the yoke S is actuated through the engagement of the pin 11 with the cam-groove 10 to swing the die L to the right, as viewed in Figs. 2 and 6. The die L swings to a position beneath the end of the feeding-chute and in this position still rests upon the upper surface of the plunger M. The plunger M is now raised by the cam P until the recess in the die engages the hook in the end of the feed-chute. The plunger M remains in this position while the die L is swinging back to its central position beneath the upper die H, the hook being taken from the chute by this movement and being pressed into the recess in the die as the die passes beneath the finger 74. The die L being in its central position and the hook being positioned in the die with its flange supported by the upper surface of the projection l and its body portion positioned by the recess in the die, the plunger M is raised by the cam P to carry the die L upward and force the shank of the hook through the shoe-upper against the lower face of the die H. During the continued revolution of the shaft B the cam P allows the die L and plunger M to be returned to their lowest position by means of the spring n. During the downward movement of the die L the cam-rib 33 engages a tooth of the rack 34 and moves the carriage 35 and, through the intermediate connections, the table K forward, the pawl 38 riding over the teeth of the rack on the frame of the machine and engaging a tooth of the rack to hold the carriage 35 against the tension of the spring 37 when the cam-rib 33 leaves the rack 34. The above-described cycle of operations is repeated until the carriage 35 has moved forward to a position in which the lug 42 on the arm 39 is brought into the path of the tooth 40 of the collar 41. When the carriage 35 has reached this position, as the shaft B completes its revolution the tooth 40, engaging the lug 42, depresses the arm 39 and disengages the pawl 38 from the fixed rack. As soon as the pawl 38 is disengaged from its rack the carriage 35 and table K are returned to their initial positions by the spring 37. As the arm 39 is depressed to disengage the pawl 38 from its rack the shaft 61 is rocked and the inclined projection 64 brought into the path of the projection 65 on the clutch member W, and as the shaft B continues to revolve the lug 65 engages the lug 64, and the clutch member W is thereby forced away from the clutch member 28 and the revolution of the shaft B stops. The other side of the shoe-upper is now placed in position on the table K and the lever 20 depressed to throw the clutch member W into engagement with the clutch member 28 and to shift the yoke S into a position to swing the die L to and from the feed-chute at the left. The cycle of operations above described is now repeated and a series of left hooks secured to the shoe-upper. Should it be desired to stop the machine after the insertion of any particular hook, the treadle from which the lever 20 is actuated is released, and as the shaft B completes its revolution the opening of the flange r comes opposite the flange 14ª of the lever 14 and allows the spring 29 to actuate the clutch-actuating member 25 to move the clutch member W away from the member 28. It will be seen that the cam-rib 33 engages the rack 34 during a portion only of the revolution of the driving-shaft. In the initial position of the shaft B the cam-rib 33 is out of engagement with the rack 34, and consequently the table K can be moved forward by hand against the tension of the spring 37. The arm 39, which carries the holding-pawl 38, is provided with a handle by means of which the arm 39 can be operated by hand to remove the holding-pawl from its rack and allow the carriage 35 and feed-table K to be returned to their initial position by the spring 37. By this arrangement the feed-slide can be moved manually to any desired position and a single hook inserted.

The operation of the mechanism for feeding the hooks from the hoppers to the feed-chutes has been indicated in connection with the description of the construction, and further description thereof is deemed unnecessary.

The machine which I have illustrated in the drawings and above described embodies my invention in the best form at present known to me; but it is to be understood that my invention is not limited thereto, but may be embodied in many different constructions without departing from the spirit thereof.

Having thus described my invention, I claim as new and desire to secure by Letters Patent—

1. In a machine for fastening lacing-hooks, a die provided with a surface for supporting the flange or base portion of the hook and with means engaging the body portion of either a right or left hook to hold it in required position, substantially as described.

2. In a machine for fastening lacing-hooks, a die provided with a surface for supporting the flange or base portion of a hook, and a recess shaped to receive the body portion of both right and left hooks, substantially as described.

3. In a machine for fastening lacing-hooks, a die having a raised projection with an open channel at one side and a channel at the base of said projection to accommodate the body portion of the hook, substantially as described.

4. A machine for fastening lacing-hooks, having, in combination, a pair of dies constructed for setting right and left hooks, means for separately holding supplies of right and left hooks, and means for feeding a hook from either of said supplies between the dies, substantially as described.

5. A machine for fastening lacing-hooks, having, in combination, a pair of dies constructed for setting right and left hooks, two chutes for holding right and left hooks, respectively, and means for moving one of the dies to and from either chute to feed a hook between the dies, substantially as described.

6. A machine for fastening lacing-hooks, having, in combination a pair of dies, two chutes located upon opposite sides of said dies for holding right and left hooks respectively, and means for moving one of the dies to and from either chute to feed a hook between the dies, substantially as described.

7. A machine for fastening lacing-hooks, having, in combination, upper and lower dies, two chutes for holding right and left hooks, respectively, said lower die being arranged to move horizontally from a middle position between said chutes to either chute to receive a hook and means to actuate said lower die, substantially as described.

8. A machine for fastening lacing-hooks, having, in combination, an upper die, a lower die pivotally mounted to swing horizontally, two chutes located upon opposite sides of said dies for holding right and left hooks, respectively, and means to swing said lower die to and from either of said chutes to feed a hook between the dies, substantially as described.

9. A machine for fastening lacing-hooks, having, in combination, an upper die, an oscillating lower die, a rock-shaft carrying the lower die, two chutes located upon opposite sides of said dies and means for actuating the shaft to move the lower die to and from either chute, substantially as described.

10. A machine for fastening lacing-hooks, having, in combination, upper and lower dies, a reciprocating plunger and actuating means therefor, the lower die being supported on the plunger, a pivot for said die substantially parallel with the axis of the plunger, and means for imparting to the die an oscillating movement on the plunger, substantially as described.

11. A machine for fastening lacing-hooks, having, in combination, upper and lower dies, a reciprocating plunger upon which the lower die is supported, means for actuating the plunger, means for oscillating the lower die comprising a shaft independent of the plunger to which the die is secured, and means for oscillating the shaft, substantially as described.

12. A machine for fastening lacing-hooks, having, in combination, upper and lower dies, the lower die being constructed to receive both right and left hand hooks, and means to move said die laterally to either side of its position directly beneath the upper die, substantially as described.

13. A machine for fastening lacing-hooks, having, in combination, an upper die, a lower die pivotally mounted to swing horizontally, a pivot therefor, arms to engage the pivot of the die on opposite sides, and means for actuating the arms to oscillate the die on either side of its position directly beneath the upper die, substantially as described.

14. A machine for fastening lacing-hooks, having, in combination, a hopper provided with a discharge-opening for the hooks, a carrier-plate arranged to reciprocate vertically in said hopper, having an inclined upper edge, a hook-lifting plate carried by said carrier-plate, means for reciprocating said plates to and from the discharge-opening, and means for oscillating the hook-lifting plate to bring its upper edge parallel with the inclined upper edge of the carrier-plate when the upper edges of the plates are opposite the discharge-opening, the upper edge of the carrier-plate acting to support the body portion of the hooks, substantially as described.

15. A machine for fastening lacing-hooks, having, in combination, a hopper provided with a discharge-opening for the hooks, a hook-lifting plate for selecting the hooks and discharging them through said opening, means for actuating the plate, and a support for the body portion of the hooks in their passage along the edge of the hook-lifting plate to said opening, substantially as described.

16. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, means for imparting a step-by-step movement to the feed-table, and means for adjusting the extent of such movement, substantialy as described.

17. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, means for imparting a step-by-step movement to the feed-table and means for returning the table to its initial position, substantially as described.

18. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, and means for imparting a step-by-step movement to the feed-table, arranged to allow the table to be moved manually in the direction of feed, substantially as described.

19. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, means for imparting a step-by-step movement to the feed-table arranged to allow the table to be moved manually, and means under the control of the operator for returning the table to its initial position, substantially as described.

20. A machine for fastening lacing-hooks, having, in combination, setting-dies and actuating mechanism therefor, means for feeding the lacing-hooks to the dies, feeding mechanism arranged to feed the material step by step, and means for automatically throwing the feeding mechanism and die-actuating mechanism out of operation after a predetermined number of feeding movements, substantially as described.

21. A machine for fastening lacing-hooks, having, in combination, setting-dies and actuating mechanism therefor, means for feeding the lacing-hooks to the dies, feeding mechanism arranged to feed the material step by step, means for automatically throwing the feeding mechanism and die-actuating mechanism out of operation after a predetermined number of feeding movements, and means for varying said predetermined number of feeding movements, substantially as described.

22. A machine for fastening lacing-hooks, having, in combination, setting-dies and actuating mechanism therefor, feeding mechanism arranged to feed the material step by step, having provision for varying the extent of the feed movements, means for automatically throwing the feeding mechanism and die-actuating mechanism out of operation at the end of a predetermined number of feeding movements, and means for varying said predetermined number of feeding movements, substantially as described.

23. A machine for fastening lacing-hooks, having, in combination, setting-dies and actuating mechanism therefor, feeding mechanism arranged to feed the material step by step, means under the control of the operator for throwing the feeding and die-actuating mechanisms out of operation at the end of any feed movement, and means for automatically throwing said mechanisms out of operation at the end of a predetermined number of feed movements, substantially as described.

24. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, means for imparting a step-by-step movement to the feed-table, a driving-shaft, a clutch thereon, and means for automatically disengaging the clutch when a predetermined number of movements have been imparted to the feed-table, substantially as described.

25. A machine for fastening lacing-hooks, having, in combination, setting-dies and actuating mechanism therefor, means for separately holding supplies of right and left hooks, mechanism for moving one of the dies to and from either holding means to feed a hook between the dies, means for connecting the die with such mechanism so as to be moved to and from either holding means, and simultaneously throwing the die-actuating mechanism into operation, substantially as described.

26. A machine for fastening lacing-hooks, having, in combination means for separately holding supplies of right and left hooks, setting-dies and actuating mechanism therefor, said mechanism comprising a driving-shaft and intermediate connections, connections from said shaft to one of the dies for moving it to and from either hook-holding means to feed a hook between the dies, a clutch on the driving-shaft, a clutch-actuating member, a member for shifting the connections between the shaft and die to cause it to be moved to and from either hook-holding means, means for actuating said member to shift said connections to either position, and for simultaneously actuating the clutch-actuating member, substantially as described.

27. A machine for fastening lacing-hooks, having, in combination, upper and lower dies, a shaft for the lower die, and arms to turn said shaft in opposite directions and oscillate the lower die, clutch-operating mechanism and a lever operatively connected with said mechanism and said arms, and a chute to deliver the hooks to the lower die, substantially as described.

28. In a machine for fastening lacing-hooks, a die having a projection for supporting the flange or base portion of the hook provided at one side with an open channel to receive the body portion of the hook and hold it in required position, substantially as described.

29. A machine for fastening lacing-hooks, having, in combination, a pair of coöperating dies, one of said dies being provided with a surface for supporting the flange or base portion of a hook and a recess shaped to receive the body portion of a hook, a feed-chute arranged to feed a hook with its body portion in position to be received by said die, and means for actuating said die to take a hook from said chute and carry it to a position to be acted upon by the other die, substantially as described.

30. A machine for fastening lacing-hooks, having, in combination, setting-dies and actuating mechanism therefor, feeding mechanism arranged to feed the material step by step, having provision for varying the extent of the feed movements, and means for automatically throwing the feeding mechanism and die-actuating mechanism out of operation at the end of a predetermined number of feeding movements, substantially as described.

31. A machine for fastening lacing-hooks, having, in combination, a feed-table, a carriage, means for imparting to the carriage a step-by-step movement arranged to allow the carriage to be moved manually, connections between the feed-table and carriage for imparting a step-by-step movement to the feed-table, means under the control of the operator for holding the carriage from a return movement, and a spring for returning the carriage, substantially as described.

32. A machine for fastening lacing-hooks, having, in combination, setting-dies and actuating mechanism therefor, a feed-table, a carriage, means for imparting a step-by-step movement to the carriage, connections between the feed-table and carriage for imparting a step-by-step movement to the feed-table provided with means of adjustment for varying the extent of such movement, substantially as described.

33. A machine for fastening lacing-hooks, having, in combination, setting-dies and actuating mechanism therefor, a feed-table, a carriage, means for imparting to the carriage a step-by-step movement, connections between the feed-table and carriage for imparting a step-by-step movement to the feed-table, means for holding the carriage from a return movement, means for automatically disengaging said holding means after a predetermined number of feeding movements, and a spring for returning the carriage to its initial position, substantially as described.

34. In a machine for fastening lacing-hooks, having, in combination, setting-dies and actuating mechanism therefor, a feed-table, a carriage, means for imparting to the carriage a step-by-step movement, connections between the feed-table and carriage for imparting a step-by-step movement to the feed-table provided with means of adjustment for varying the extent of such movement, means for holding the carriage from a return movement, means for automatically disengaging said holding means after a predetermined number of feeding movements, and a spring for returning the carriage to its initial position, substantially as described.

35. In a machine for fastening lacing-hooks, having, in combination, setting-dies and actuating mechanism therefor, a feed-table, a carriage, means for imparting to the carriage a step-by-step movement, connections between the feed-table and carriage for imparting a step-by-step movement to the feed-table provided with means of adjustment for varying the extent of such movement, means for holding the carriage from a return movement, means for automatically disengaging said holding means after a predetermined number of feeding movements, means for varying said predetermined number of feeding movements, and a spring for returning the carriage to its initial position, substantially as described.

36. In a machine for fastening lacing-hooks, having, in combination, setting-dies and actuating mechanism therefor, a feed-table, a carriage, means for imparting to the carriage a step-by-step movement, connections between the feed-table and carriage for imparting a step-by-step movement to the feed-table, means for holding the carriage from a return movement, means for automatically disengaging said holding means after a predetermined number of feeding movements, means for varying said predetermined number of feeding movements, and a spring for returning the carriage to its initial position, substantially as described.

37. A machine for fastening lacing-hooks, having, in combination, an upper die, a lower die provided with a surface for supporting the flange or base portion of a hook and a recess to receive the body portion of the hook, a feed-chute arranged to feed a hook with its body portion in position to be received by the lower die, said lower die being movable to a position to bring the recess in line with the hook, then to a position to receive the hook in said recess and then to a position to coöperate with the upper die in setting the hook, and means for actuating the lower die, substantially as described.

38. A machine for fastening lacing-hooks, having, in combination, setting-dies and actuating mechanism therefor, means for feeding the lacing-hooks to the dies, feeding mechanism arranged to feed the material step by step, and means operating independently of the length of the individual feed movements for automatically throwing the feeding mechanism and die-actuating mechanism out of operation after a predetermined number of feeding movements, substantially as described.

39. A machine for fastening lacing-hooks, having, in combination, setting-dies and actuating mechanism therefor, means for feeding the lacing-hooks to the dies, feeding mechanism arranged to feed the material step by step, means operating independently of the length of the individual feed movements for automatically throwing the feeding mechanism and die-actuating mechanism out of operation after a predetermined number of feeding movements, and means for varying said predetermined number of feeding movements, substantially as described.

40. A machine for fastening lacing-hooks, having, in combination, setting-dies and actuating mechanism therefor, feeding mechanism arranged to feed the material step by step, having provision for varying the extent of the feed movements, means operating independently of the length of the individual feed movements for automatically throwing the feeding mechanism and die-actuating mechanism out of operation at the end of a predetermined number of feeding movements, and means for varying said predetermined number of feeding movements, substantially as described.

41. A machine for fastening lacing-hooks, having, in combination, setting-dies and actuating mechanism therefor, feeding mechanism arranged to feed the material step by step, means under the control of the operator for throwing the feeding and die-actuating mechanisms out of operation at the end of any feed movement, and means operating independently of the length of the individual feed movements for automatically throwing said mechanisms out of operation at the end of a predetermined number of feed movements, substantially as described.

42. A machine for fastening lacing-hooks, having, in combination, setting-dies and actuating mechanism therefor, means for feeding the lacing-hooks to the dies, a feed-table arranged to support the material in position for the setting-dies to fasten the hooks thereto, means for imparting a step-by-step movement to the feed-table, a driving-shaft, a clutch thereon, and means operating independently of the length of the individual movements for automatically disengaging the clutch when a predetermined number of movements have been imparted to the feed-table, substantially as described.

43. A machine for fastening lacing-hooks, having, in combination, setting-dies and actuating mechanism therefor, feeding mechanism arranged to feed the material step by step having provision for varying the extent of the feed movements, and means operating independently of the length of the individual feed movements for automatically throwing the feeding mechanism and die-actuating mechanism out of operation at the end of a predetermined number of feeding movements, substantially as described.

Witness my hand to the foregoing specification this 20th day of June, 1899.

HARRISON H. EATON.

Witnesses:
H. T. FISHER,
R. B. MOSER.